United States Patent [19]
Lukens et al.

[11] Patent Number: 5,923,100
[45] Date of Patent: Jul. 13, 1999

[54] APPARATUS FOR CONTROLLING A SOLAR ARRAY POWER SYSTEM

[75] Inventors: Frederick E. Lukens; Robert L. Moser, both of Littleton, Colo.

[73] Assignee: Lockheed Martin Corporation, Bethesda, Md.

[21] Appl. No.: 08/828,698

[22] Filed: Mar. 31, 1997

[51] Int. Cl.⁶ .................................................. G05F 5/00
[52] U.S. Cl. .............................. 307/66; 307/64; 320/101; 323/906; 323/74; 136/206; 136/292; 244/173
[58] Field of Search ............................ 307/66, 64, 126; 323/299, 906; 320/101; 363/74; 136/292, 206; 244/173

[56] References Cited

U.S. PATENT DOCUMENTS

| | | | |
|---|---|---|---|
| 3,384,806 | 5/1968 | Hartman | 126/9 R |
| 3,566,143 | 2/1971 | Paine et al. | 307/126 |
| 4,163,194 | 7/1979 | Ross | 324/29.5 |
| 4,175,249 | 11/1979 | Gruber | 323/15 |
| 4,204,147 | 5/1980 | Larrabee | 323/4 |
| 4,223,214 | 9/1980 | Dorian et al. | 250/203 |
| 4,327,318 | 4/1982 | Kwon et al. | 320/39 |
| 4,333,136 | 6/1982 | Baker | 363/43 |
| 4,375,662 | 3/1983 | Baker | 323/96 |
| 4,404,472 | 9/1983 | Steigerwald | 307/46 |
| 4,445,049 | 4/1984 | Steigerwald | 307/45 |
| 4,580,090 | 4/1986 | Bailey et al. | 323/303 |
| 4,604,567 | 8/1986 | Chetty | 323/299 |
| 4,794,272 | 12/1988 | Bavaro et al. | 307/64 |
| 4,873,480 | 10/1989 | Lafferty | 323/229 |
| 5,268,832 | 12/1993 | Kandatsu | 363/95 |
| 5,327,071 | 7/1994 | Frederick et al. | 323/299 |
| 5,394,075 | 2/1995 | Ahrens et al. | 320/39 |
| 5,604,430 | 2/1997 | Decker et al. | 323/906 |

FOREIGN PATENT DOCUMENTS

| | | |
|---|---|---|
| 0 029 743 | 11/1980 | European Pat. Off. |
| 0 029 744 | 11/1980 | European Pat. Off. |

OTHER PUBLICATIONS

Roesler, Dietrich J., "60kW Solar Cell Power System with Peak Power Tracking and Utility Interface", Jun. 1978, pp. 978–983.

Salim, Abbas A., "Regulation and Control of Solar Array Power—A Minimum Power Dissipation Approach", Oct. 1978, pp. 121–127.

"Sun Tracker for Clear or Cloudy Weather", NASA Tech Briefs, Spring 1979, p.42.

"Solar Power Conditioner", NASA's Jet Propulsion Laboratory.

*Primary Examiner*—Jeffrey A. Gaffin
*Assistant Examiner*—Albert W. Paladini
*Attorney, Agent, or Firm*—Holme Roberts & Owen

[57] ABSTRACT

A system for controlling power supplied by a solar array panel to one of either a load or a battery for optimal power consumption is disclosed. The solar array power control system of the present invention includes a power stage for directing the solar array to discharge an appropriate amount of current, a signal conditioner for receiving and conditioning voltage and current signals from the solar array and determining the signs of the time derivatives of solar array voltage and power, a processor for evaluating the signs of the time derivatives of solar array power voltage and for directing operation of either a battery current control mode or a peak power tracking mode and a high gain amplifier for directing an appropriate voltage to the power stage according to the operating mode. The signal conditioner, processor and high gain amplifier cooperate to determine whether the solar array is capable of supplying the power demanded by at least one of the battery and the load. When it has been determined that the required power level to be supplied from the solar array is within the capability of the solar array, the system commands the solar array to discharge the exact power demanded. In times when the solar array is not capable of completely satisfying the required power level, the system commands the solar array to discharge the maximum power available under the present conditions.

36 Claims, 8 Drawing Sheets

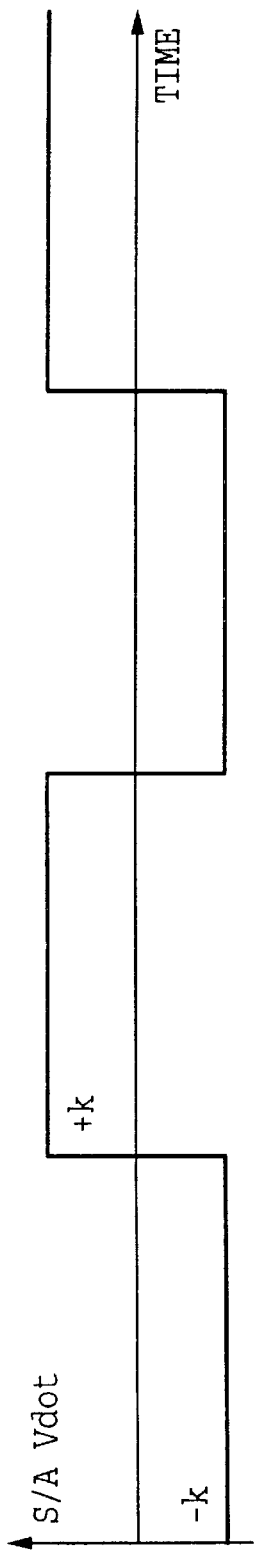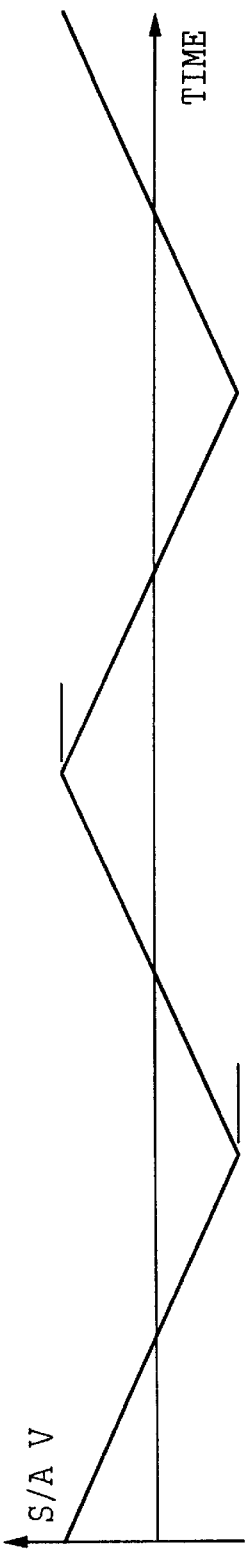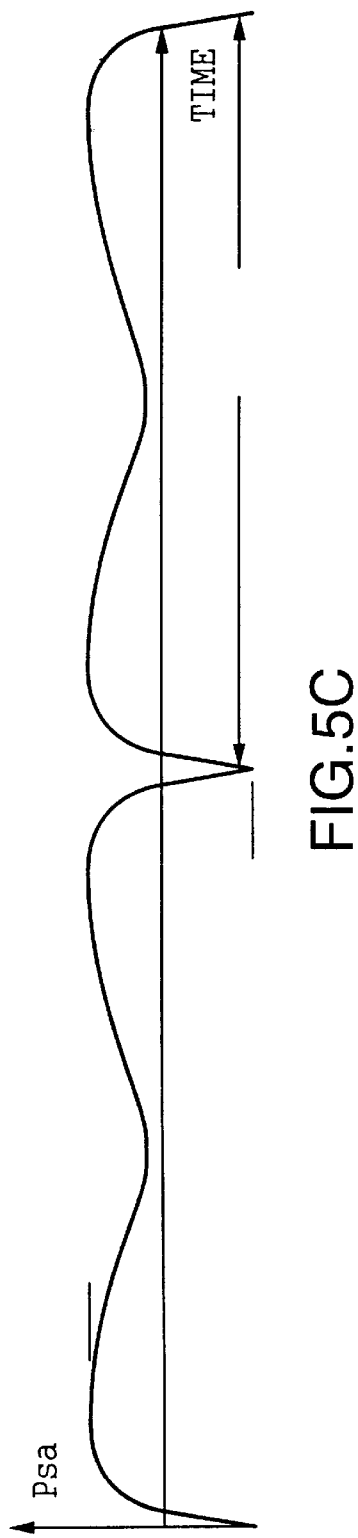

APPARATUS FOR CONTROLLING A SOLAR ARRAY POWER SYSTEM

FIELD OF THE INVENTION

The present invention relates generally to solar array power systems, and in particular to a system for controlling the power output from a solar array to one of at least a battery and a load member.

BACKGROUND OF THE INVENTION

Many space and terrestrial devices are powered by solar energy generated from an array of photovoltaic cells. In these applications, the electrical power available from the solar array is dependent on a variety of factors including temperature, illumination available, the number of solar cells in the array and many other array properties. Given this sometimes unpredictable fluctuation of electrical energy, control of the electrical power from the solar array is essential for efficient operation of those applications that utilize solar power. Many developments in electrical power control systems for solar arrays have concentrated upon determining the peak power available from the solar array and applying that peak power when there is adequate load and battery demand.

Such peak power control systems generally utilize a variety of techniques to ascertain the maximum power available from the solar array. In particular, some peak power control systems determine the maximum power available from the solar array to constantly apply that peak power to a load. One system for determining the maximum power available from the solar array detects the current and voltage at either the load or the solar array to calculate the power value, which is used to define the operating point of the solar array. Subsequently, the operating point of the solar array is moved a small amount and a new power setting is compared to the previous power setting. If the power measured at the new setting is larger, the solar array operating point is moved again in the same direction. This iterative process is repeated until the new power operating point is lower than the previous operating point. At that time, the operating point is moved in the opposite direction until the power drops again. This operation for obtaining the peak power from the solar array is known as dithering. Another system for obtaining the peak power from a solar array attempts to approximate the peak power available from the solar array by utilizing an assumed characteristic of the solar array. In such systems, the voltage maximizing the power output is assumed to be constant or linearly related to the current. For peak power control, the current value is sampled and an input to a voltage reference circuit determines how the solar array output should be adjusted to obtain the maximum power.

As such, some devices for controlling electrical power from solar arrays seek, at all times, to deliver to loads the maximum power available from the solar array. Yet, given the load demand on the solar array, a constant delivery of maximum power may not be the most efficient utilization of the power available from the solar array nor the most effective manner to protect the battery power source. In addition, many existing peak power trackers are not designed for wide voltage changes that are output from the solar array such as voltage changes that occur while a system is in low earth orbit.

SUMMARY OF THE INVENTION

Accordingly, it is an object of the present invention to provide a solar array power control system capable of supplying energy (e.g., power) from the solar array to at least one of a load and a battery.

It is another object of the invention to provide a solar array power control system having the ability to supply the power demanded by a least one of a load and a battery at times when it has been determined that the required power level is within the capacity of the solar array.

It is a further object of the invention to provide a solar array power control system capable of supplying the maximum power available from the solar array at times when the maximum power available from the solar array cannot completely satisfy the demand required by at least one of the load and the battery.

According to the present invention, a solar array power control system is provided that is capable of controlling power from a solar array to at least one of a load and a battery. In one aspect of the present invention, the solar array power control system includes a power stage for directing the solar array to discharge an appropriate amount of current, a signal conditioner for receiving voltage and current signals from the solar array and determining the signs of the time derivatives of solar array voltage and power, a processor for evaluating the signs of the time derivatives of solar array power voltage and for directing operation of either a battery current control mode or a peak power tracking mode and a high gain amplifier for directing an appropriate voltage to the power stage according to the operating mode. As such, the solar array power control system utilizes the signs of time derivatives of solar array voltage and power to provide an appropriate amount of power from the solar array to at least one of the battery and the load.

In the present invention, the solar array power versus solar array voltage can be characterized by a curve having a peak power point with zero slope, a first region with a positive slope with respect to solar array voltage and a second region with a negative slope with respect to solar array voltage. With regard to the power curve, the solar array power control system of the present invention determines an instantaneous operating region on the power curve in which the solar array is operating. From the operating region of the solar array, a determination is made as to whether the solar array is capable of supplying the power demanded by at least one of the battery and the load. From this determination, the solar array power control system directs the power stage to either supply the exact power demanded by at least one of the load and the battery at times when it has been determined that the required power level is within the capacity of the solar array, or to supply the maximum power available from the solar array at times when the solar array is unable to completely satisfy the power demanded by at least one of the load and the battery.

In one embodiment of the present invention, the signal conditioner includes a multiplier for combining the solar array voltage and current signals to form solar array power, differentiators for taking the time derivatives of solar array voltage and power and comparators for determining the signs of the time derivatives of solar array voltage and power. The present invention also includes a processor having peak power tracker logic for evaluating the signs of the time derivatives of solar array voltage and power which correspond to an instantaneous operating region on the solar array peak power curve and a switch for selecting either the battery current control mode or the peak power tracking mode according to the region of operation. In addition, a high gain amplifier is provided for supplying an appropriate voltage to the power stage based on the operational mode of the system.

In another aspect of the invention, the solar array power control system further includes an overvoltage protection control system which prevents detrimentally high bus voltages from damaging the battery or the load. In a preferred embodiment, the overvoltage protection control includes a high gain amplifier for comparing the bus voltage with a predetermined maximum bus voltage limit. In the event that the bus voltage is greater than the predetermined maximum bus voltage limit, the overvoltage high gain amplifier will produce an appropriate voltage that will be subtracted from the output voltage of the peak power tracking high gain amplifier so as to ensure that the resultant bus voltage is below the predetermined maximum bus voltage.

BRIEF DESCRIPTION OF THE DRAWINGS

FIGS. 5A–5C are waveform diagrams showing the derivative of the solar array voltage, the solar array voltage, and power while the solar array is operating in the peak power tracking mode;

DETAILED DESCRIPTION

Figure 1:
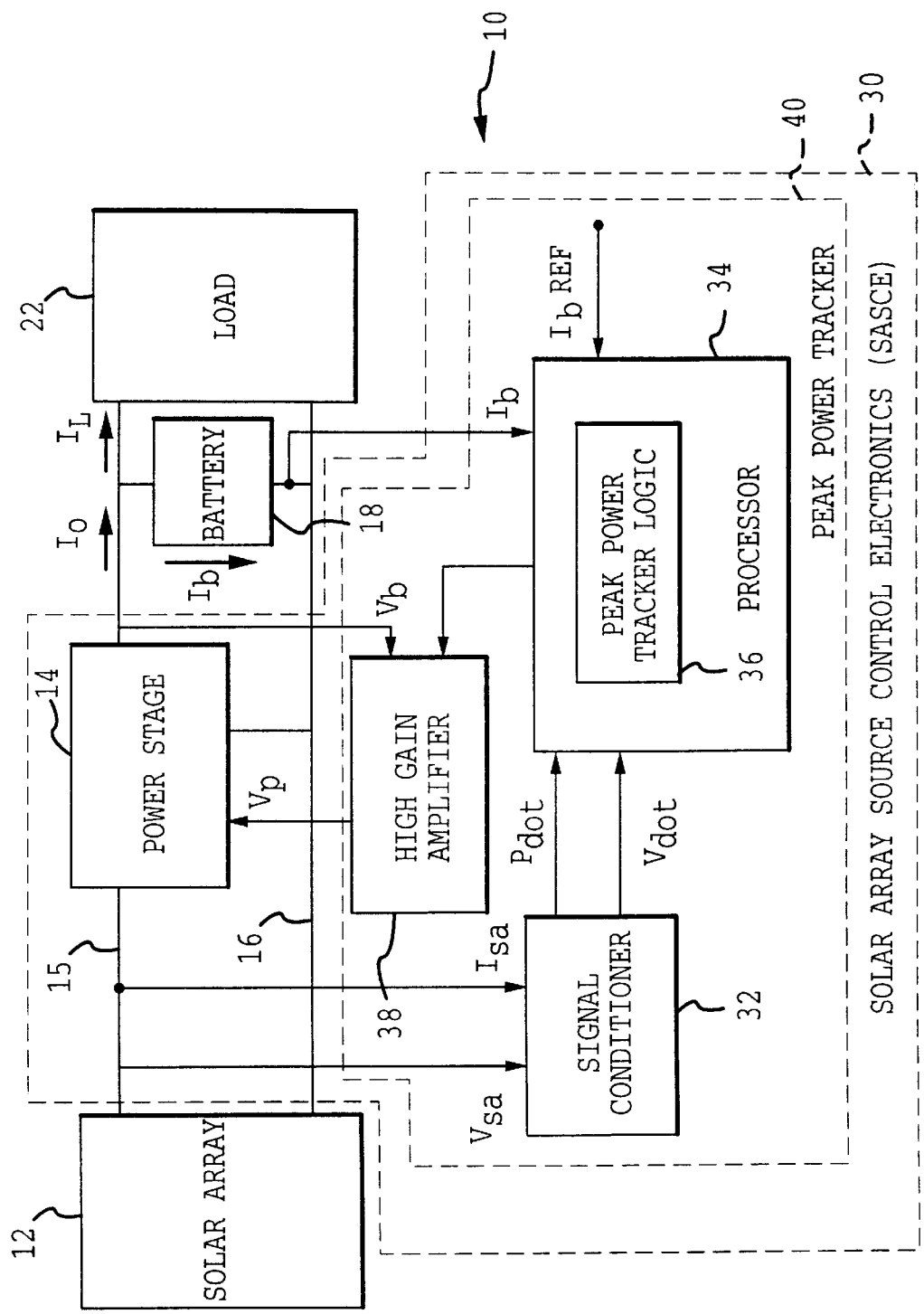
FIG. 1 is a block diagram showing a satellite provided with one embodiment of a solar array source control system according to the present invention.

The solar array source control electronics system of the present invention is generally used to control the output or application of power from a solar array containing photovoltaic cells to at least one of a battery and a load. Power output from the solar array, which generally is capable of converting solar energy into electrical energy, when plotted versus solar array voltage may be generally characterized by a solar array peak power curve having a peak power point with zero slope, a first region to the left of the peak power point with a positive slope, and a second region to the right of the peak power point with a negative slope, substantially as illustrated in FIG. 2. As such, the system of the present invention is capable of controlling power output from a solar array by providing electric power from the solar array in one of a battery current control mode, where the power output from the solar array is in the second region of the curve, and a peak power tracker mode, where the power output from the solar array is at or near the peak power point. In one embodiment of the present invention, illustrated in FIG. 1, the system 30 controls power output from the solar array in the peak power tracker mode by limit cycling (also known as peak power tracking) the power supplied from the solar array 12 to at least one of the battery 18 and load 22, and controls the power output from the solar array 12 in the battery current control mode by supplying the power demanded by at least one of the battery 18 and load 22. In this regard, the system 30 is capable of determining an instantaneous operating region of the solar array 12 with reference to the solar array peak power curve such that an appropriate amount of power will be provided by the solar array to at least one of the battery 18 and load 22 and peak power will not be applied from the solar array 12 when it is not necessary.

FIG. 2 illustrates a solar array power-voltage curve and a solar array current-voltage curve. The solar array peak power point, indicated by point A on the solar array power-voltage curve, corresponds to the maximum power available from the solar array 12 at any given present condition. In this regard, the maximum power available from the solar array 12 varies according to temperature and the amount of illumination available to be converted to electrical energy. At the solar array peak power point A, a time derivative, $P_{dot}$, of solar array power, $P_{sa}$, is zero while the time derivative, $V_{dot}$, of solar array voltage, $V_{sa}$, is not zero, finite. The solar array instantaneous operating region, which is used to determine whether the solar array 12 is capable of supplying the power demanded by at least one of the battery 18 or the load 22, can be determined from the signs of the time derivatives of the solar array power, $P_{dot}$, and voltage, $V_{dot}$. As such when the signs of the time derivatives of solar array power, $P_{dot}$, and voltage, $V_{dot}$, are the same (e.g., both positive, both negative), the present condition of the solar array 12 places the instantaneous operating region in the first region of the power curve, here indicated by point B. When the solar array is operating in this first region, the characteristics of the solar array 12 are such that the current demanded by the load 22 and the battery 18 is larger than the amount of current which the solar array 12 can supply. The system 30 operates in such a manner as to avoid prolonged operation in the first region. Generally, when the system 30 begins to operate in the first region, the peak power tracking mode is activated and the system 30 cycles at or near the peak power point as shown in FIG. 2. As such, according to the present invention, for optimal power delivery and consumption in this mode, the solar array 12 discharges its maximum current and the battery 18 may discharge a current to the load 22 if the maximum current from the solar array 12 is insufficient to completely satisfy the demand by the load 22.

Conversely, and of primary importance, when the signs of the time derivatives of solar array power, $P_{dot}$, and voltage, $V_{dot}$, are different, $P_{dot}$ being negative and $V_{dot}$ being positive or $P_{dot}$ being positive and $V_{dot}$ being negative, the present condition of the solar array 12 places the instantaneous operating region in the second region of the power curve, here indicated by point C. When operating in the second region of the power curve, according to the present invention, a reference battery current, $I_{bref}$, and an actual battery current, $I_b$, are compared to determine whether the solar array 12 is capable of supplying the current demanded by both the battery 18 and the load 22. The actual battery current, $I_b$, represents a signal proportional to the current in the battery 18. The reference battery current, $I_{bref}$, is a programmed current corresponding to the maximum current that can be input to the battery 18 as a function of the present temperature and voltage of the battery 18. If the reference battery current, $I_{bref}$, is larger than the actual battery current, $I_b$, the present condition of the solar array is such that it cannot supply the current demanded by both the battery 18 and the load 22. In this regard, in instances where the reference battery current, $I_{bref}$, is larger than the actual battery current, $I_b$, the peak power tracking mode is activated and the solar array 12 is commanded by the system 30 to output its maximum current. However, when the reference battery current, $I_{bref}$, is less than the actual battery current, $I_b$, the system 30 commands the solar array 12 to supply the current demanded by both the battery 18 and the load 22. In this state, the system 30 operates in the battery current control mode. In this mode, the solar array 12 is commanded to output only the amount of power that is sufficient to satisfy the load 22 and the battery 18 demand, which is typically less than the peak power of the solar array 12.

Figure 2:
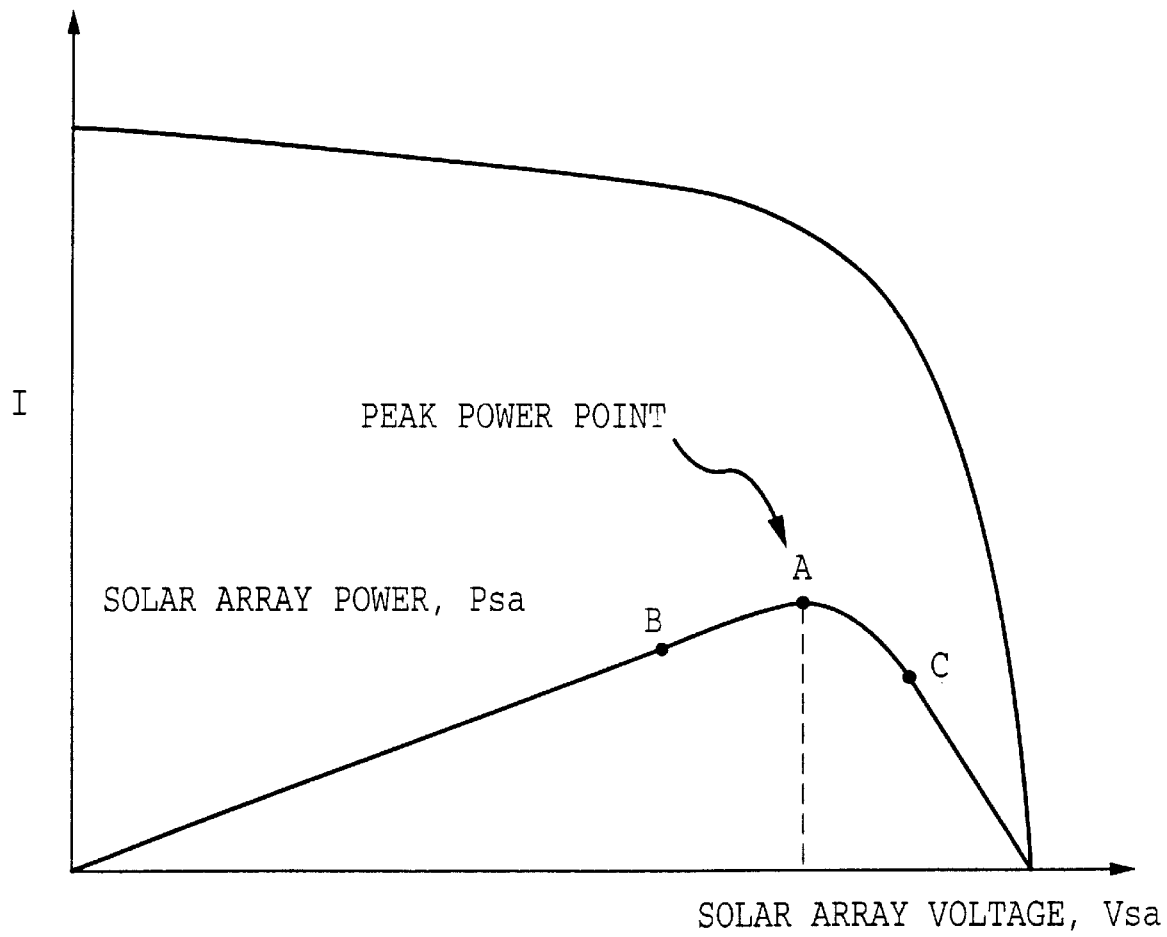
FIG. 2 is a curve of the solar array power versus solar array voltage.

In one embodiment, illustrated in FIG. 1, the system 30 or solar array source control electronics (SASCE) is included in a satellite 10 and generally includes a peak power tracking control 40 for determining the optimal current that the solar array 12 should discharge and a power stage 14 interconnected thereto for commanding the solar array 12 to discharge current according to the mode in which the system 30 is operating. For optimal power consumption by satellite 10, the system 30 controls the power output from solar array 12 to at least one of the battery 18 and the load 22 which are interconnected thereto via bus lines 15 and 16. In this regard, the peak power tracking control 40 is capable of determining the sign of the time derivatives, $V_{dot}$, $P_{dot}$, of the solar array voltage, $V_{sa}$, and power, $P_{sa}$, respectively, to determine the optimal amount of current to be discharged from the solar array 12 to at least one of the battery 18 and load 22.

As illustrated in FIG. 1, in one embodiment of the present invention, for purposes of determining the optimal current to be provided by the solar array 12, the peak power tracking control 40 includes a signal conditioner 32 for generating the signs of the time derivatives, $V_{dot}$, $P_{dot}$, of solar array voltage, $V_{dot}$, and power, $P_{dot}$, respectively, a processor 34 for evaluating $P_{dot}$ and $V_{dot}$ to selectively command operation of the system 30 in the battery current control mode or the peak power tracking mode and a high gain amplifier 38 for generating a signal to the power stage 14. In determining the optimal current that the solar array 12 must discharge, which is dependent upon the power required by the battery 18 and for the load 22, the signal conditioner 32 detects the signals indicative of the voltage, $V_{sa}$, and current, $I_{sa}$, being output by the solar array 12. From these solar array voltage, $V_{sa}$, and current, $I_{sa}$, values, the solar array power, $P_{sa}$, is calculated, and time derivatives of, $V_{sa}$, and, $P_{sa}$, respectively, are computed and the signs of the time derivatives, $P_{dot}$, and $V_{dot}$, are detected to determine whether the solar array 12 is operating in the first or second region of the solar array peak power curve. As such, the maximum power available from the solar array 12 may be correlated to the signs of the time derivatives, $V_{dot}$ and $P_{dot}$, and the regions on the power curve, illustrated in FIG. 2.

Figure 8:
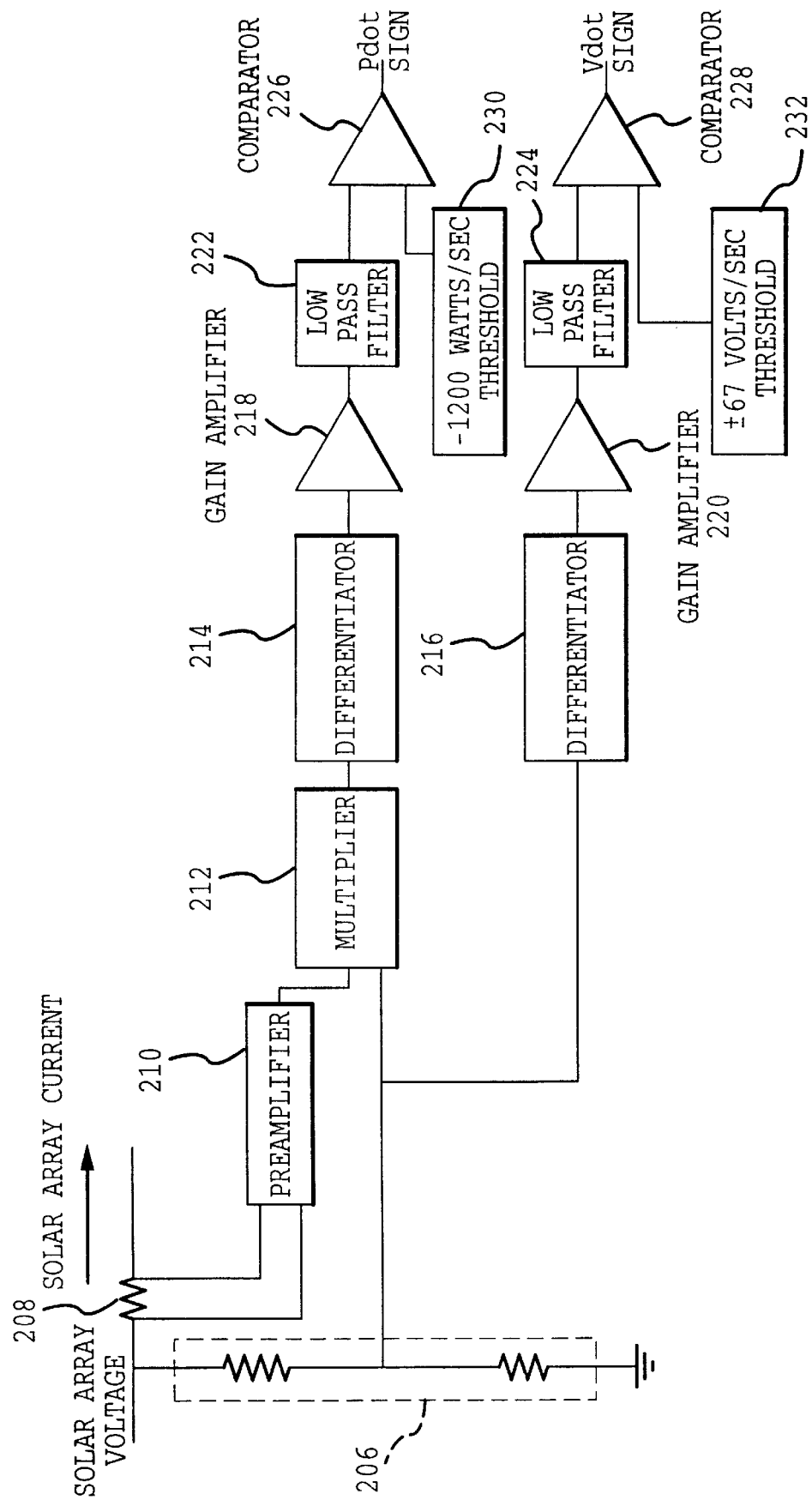
FIG. 8 is a block diagram illustrating an embodiment of the signal conditioner of the solar array source control system of the present invention.

One embodiment of the signal conditioner 32 illustrated in FIG. 1, for determining the sign of the time derivatives of the solar array output power, $P_{sa}$ and voltage, $V_{sa}$, is illustrated in FIG. 8. The sign of the time derivative, $P_{dot}$, of the solar array output power, $P_{sa}$, is accomplished by a multiplier 212 for multiplying solar array voltage, $V_{sa}$, and solar array current, $I_{sa}$, to derive solar array output power, $P_{sa}$, a differentiator 214 for taking the time derivative of the solar array output power, $P_{sa}$, and a comparator 226 for comparing the time derivative, $P_{dot}$, of the solar array output power, $P_{sa}$, to a predetermined threshold power level 230. The solar array current, $I_{sa}$, is monitored by a current sensing resistor 208 which converts the solar array current to a resulting voltage that directly correlates to the solar array current. The resulting voltage is amplified by a preamplifier 210 to increase the output signal. The output signal from the preamplifier 210 is sent to a first terminal of the multiplier 212. The solar array voltage, $V_{sa}$, is derived from a voltage divider 206 and is sent to the second terminal of the multiplier 212 which computes a signal proportional to the solar array output power, $P_{sa}$. A differentiator 214 computes a time derivative, $P_{dot}$, of the solar array power, $P_{sa}$. A gain amplifier 218 amplifies the $P_{dot}$ signal and a low pass filter 222 filters electrical noise from the $P_{dot}$ signal. The gain amplifier 218 may increase the $P_{dot}$ signal to a level detectable by comparator 226. The $P_{dot}$ signal is sent to the first terminal of the comparator 226 and a predetermined threshold power level 230 is sent to the second terminal of the comparator 226. The comparator 226 compares the signals input at the first and second terminals and outputs a logic signal indicating the sign of the $P_{dot}$ signal. In one embodiment of the invention illustrated in FIG. 8, if the comparator 226 senses a $P_{dot}$ signal that is less than −1200 watts/second, the comparator 226 will output a logic signal indicative of a negative time derivative, $P_{dot}$, of the solar array power, $P_{sa}$. The threshold value for other embodiments will be dependent upon the size of the solar array and the amount of output power the solar array is capable of producing. As stated earlier, the low pass filter is used to filter electrical noise from the $P_{dot}$ signal. In particular, the low pass filter 222 rejects the ripple current generated by the load. In a preferred embodiment, the low pass filter 222 comprises a four pole 120 hertz filter that attenuates the noise in the $P_{dot}$ signal satisfactorily to prevent the comparator from falsely triggering a negative derivative.

Similarly, the sign of the time derivative of solar array voltage is also generated by the circuit shown in FIG. 8. A voltage divider 206 generates the solar array voltage signal that is sent to differentiator 216 where a time differential, $V_{dot}$, of the solar array voltage, $V_{sa}$, is derived. The $V_{dot}$ signal is amplified by the gain amplifier 220 to increase the signal level such that the signal is detectable by the comparator 228. A low pass filter 224 is used to filter the noise from the $V_{dot}$ signal. Like the low pass filter used to filter the $P_{dot}$ signal, low pass filter 224 is used primarily to reject the ripple current generated by the loads. In a preferred embodiment, the low pass filter 224 comprises a four pole 120 hertz filter. After the $V_{dot}$ signal has been electronically filtered, comparator 228 compares the $V_{dot}$ signal to a preset threshold voltage level. In one embodiment, the threshold is set to a voltage proportional to one-half the solar array ramp voltage rate of change. In a preferred embodiment, the solar array ramp voltage rate of change is ±133 volts/second, so the threshold will be set to ±67 volts/second. Therefore, when the comparator input is greater than +67 volts per second, a logic signal is generated from the comparator 228 reflecting a positive $V_{dot}$ sign. When the $V_{dot}$ signal is less than −67 volts per second, the comparator generates a logic signal equivalent to a negative $V_{dot}$ sign.

The signs of such time derivatives, $V_{dot}$ and $P_{dot}$, are then used by processor 34 to determine whether the solar array 12 is capable of supplying the power demanded by the battery 18 and the load 20. In this regard, from the signs of $V_{dot}$ and $P_{dot}$, the processor 34 illustrated in FIG. 1 is capable of directing peak power tracker logic 36 interconnected therewith to operate in either the battery current control mode or the peak power tracking mode (which will be described in more detail herein below). In particular, the processor 34 of the peak power tracking control 40 is capable of operating the battery current control mode when the power available from the solar array 12 is sufficient to meet the demand of the battery 18 and the load 22, and the processor 34 is capable of operating in the peak power tracking mode when the power available from the solar array 12 is insufficient to meet the demands of the battery 18 and the load 22.

When an appropriate mode of operation is determined, a corresponding signal is sent from the processor 34 to the high gain amplifier 38 for amplification relative to the bus voltage, $V_b$. The amplified signal, $V_p$, from the high gain amplifier 38 is directed to the power stage 14 which is capable of drawing a current, $I_o$, from the solar array 12. According to the mode of operation, the amount of current, $I_o$, discharged from the solar array 12 may be sufficient to satisfy the current demanded by at least one of the load 22 or the battery 18. On the other hand, during operation in the peak power tracking mode at times when the solar array 12 is not capable of generating a current that will fully satisfy the demand of the load 22, the battery 18 may discharge an appropriate current to make up the deficit. This operation insures that the load 22 in satellite 10 is always satisfied. Such operation is essential for an optimal consumption of power from the solar array 12.

Figure 3:
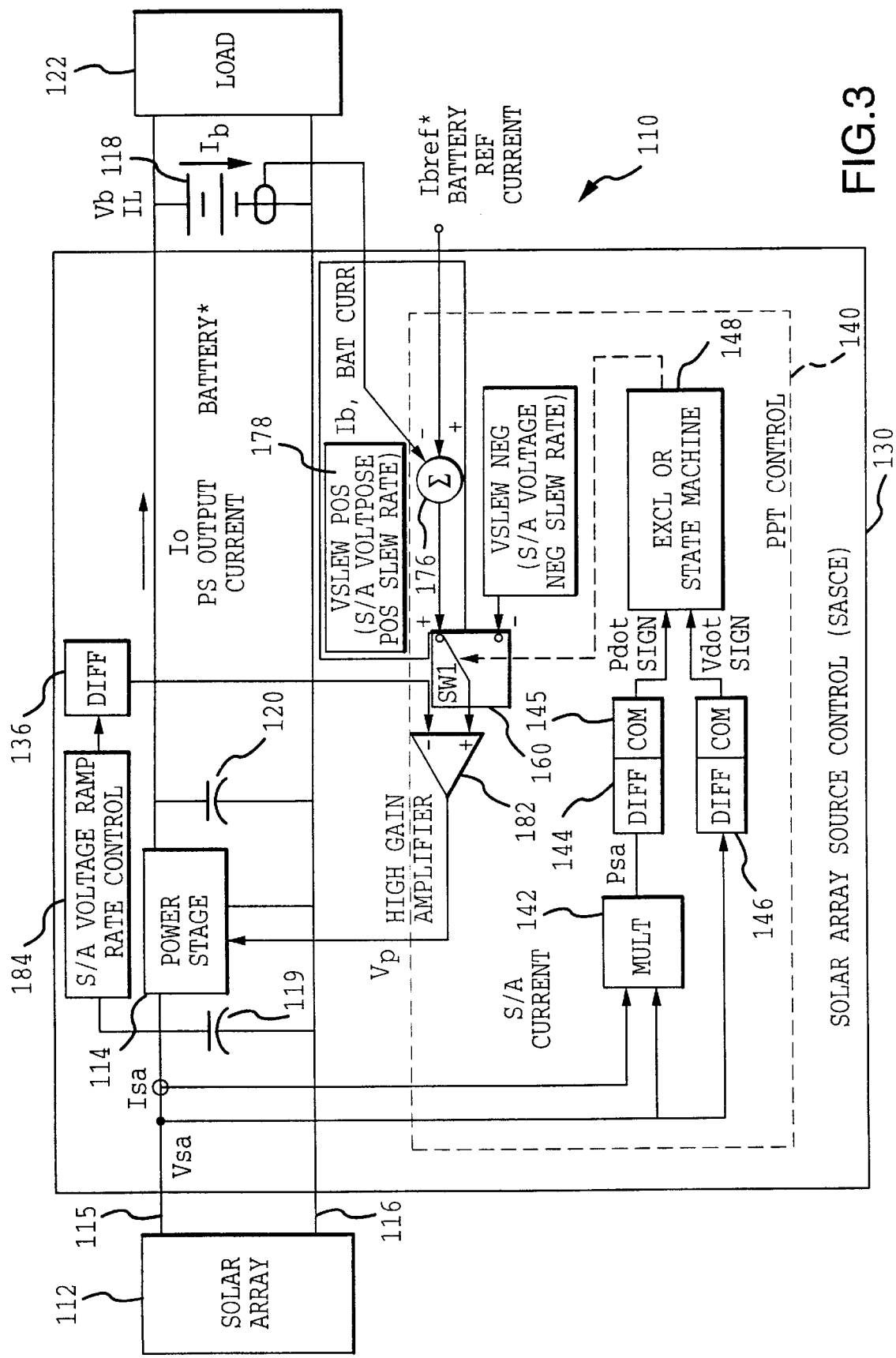
FIG. 3 is a block diagram of another embodiment of a solar array source control system.

FIG. 3 illustrates another embodiment of the system 130. In order to optimally allocate power from a solar array 112 in a satellite 110, peak power tracking control 140 includes a signal conditioner 132 for generating the signs of the time derivatives of solar array voltage, $V_{dot}$, and power, $P_{dot}$, a processor 134 for evaluating $P_{dot}$ and $V_{dot}$ to selectively command operation in the battery current control mode or the peak power tracking mode and a high gain amplifier 138 for generating a signal to the power stage 114.

Figure 6:
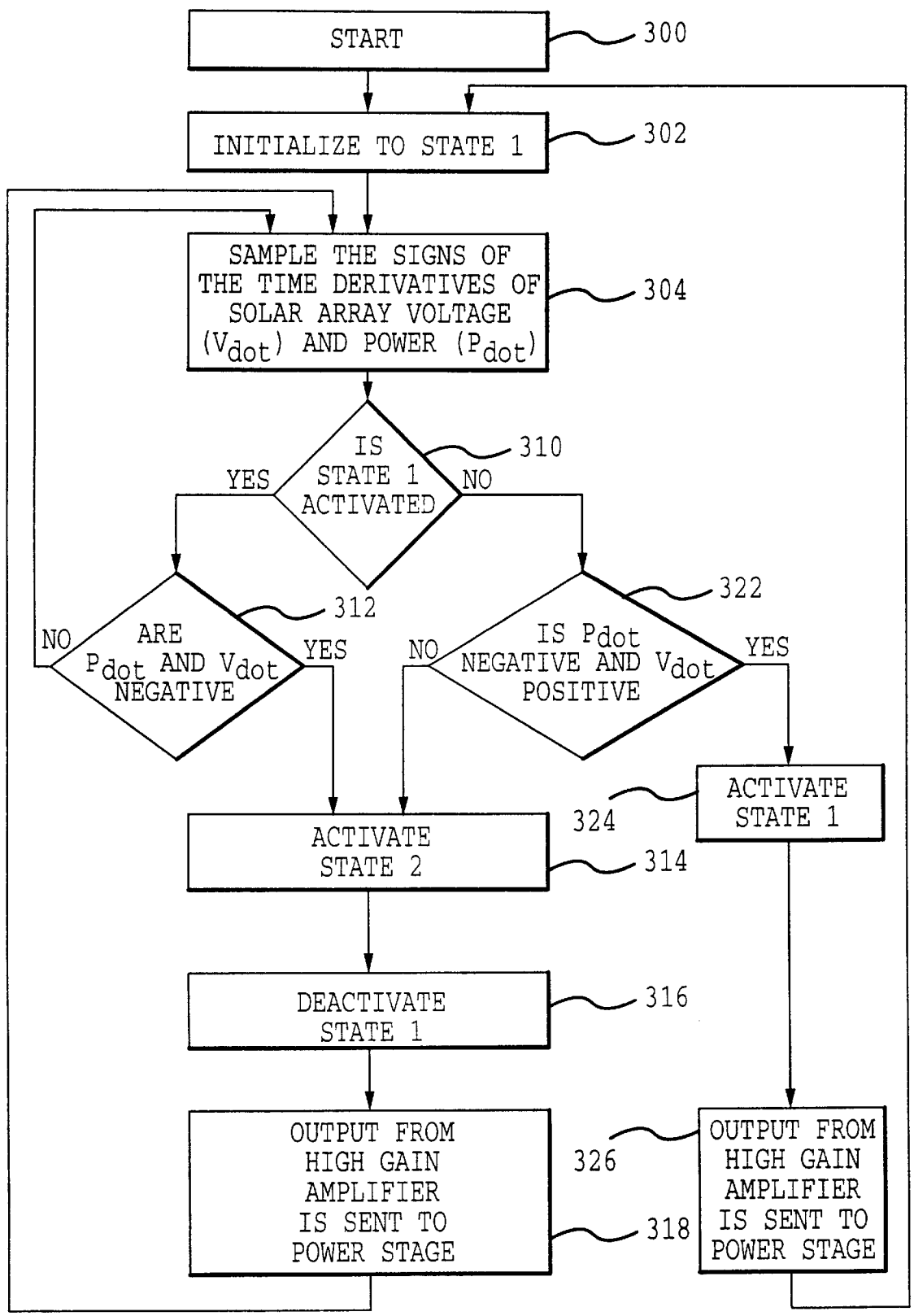
FIG. 6 is a flow chart showing operation of the peak power tracking control 140 illustrated in FIG. 3.

As illustrated in FIG. 3 and in the flow chart of FIG. 6, signal conditioner 132 includes multiplier 142 for combining solar array current, $I_{sa}$, and voltage, $V_{sa}$, and differentiators 144 and 146 for calculating time derivatives, $V_{dot}$, $P_{dot}$, of solar array voltage, $V_{sa}$, and power, $P_{sa}$, respectively. To determine the signs of the time derivatives of power and voltage, $P_{dot}$ and $V_{dot}$, the multiplier 142 receives the solar array current, $I_{sa}$, and voltage, $V_{sa}$, at its input terminals. The $I_{sa}$ and $V_{sa}$ signals are multiplied to form the solar array power, $P_{sa}$. For determining the appropriate mode of operation, these values are used to correlate to the solar array peak power curve, illustrated in FIG. 2. In this regard, the solar array power, $P_{sa}$, and solar array voltage, $V_{sa}$, are supplied to power differentiator 144 and voltage differentiator 146, respectively, and a time derivation of the signals are taken, also shown in FIG. 6. The multiplication and differentiation functions may be performed by practical integrated circuits. For detecting the signs of the signals, the differentiators 144 and 146 also include comparators 145. Such comparators 145 will output a logical "1" when the sign of the time derivative is positive and a logical "0" will be output when the sign of the time derivative is negative. The generation of the positive and negative logic signals is accomplished by the circuitry described herein in relation to FIG. 8.

The logical outputs ($P_{dot}$, and $V_{dot}$) from the comparators 145 are provided to the processor 134 which includes a state machine 148 for logically determining the region of the solar array peak power curve the solar array in which the system is operating and a switch 160 for switching between the battery current control mode or the peak power tracking mode. The state machine 148 is capable of performing a clocked logical exclusive OR function on $P_{dot}$ and $V_{dot}$, also shown in FIG. 6. By allowing only certain transitions, the state machine 148 filters out false peak power tracking control 140 transitions. By evaluating $P_{dot}$ and $V_{dot}$, state machine 148 determines whether solar array 112 is operating in either the first or second regions on the solar array peak power curve.

Figure 4:
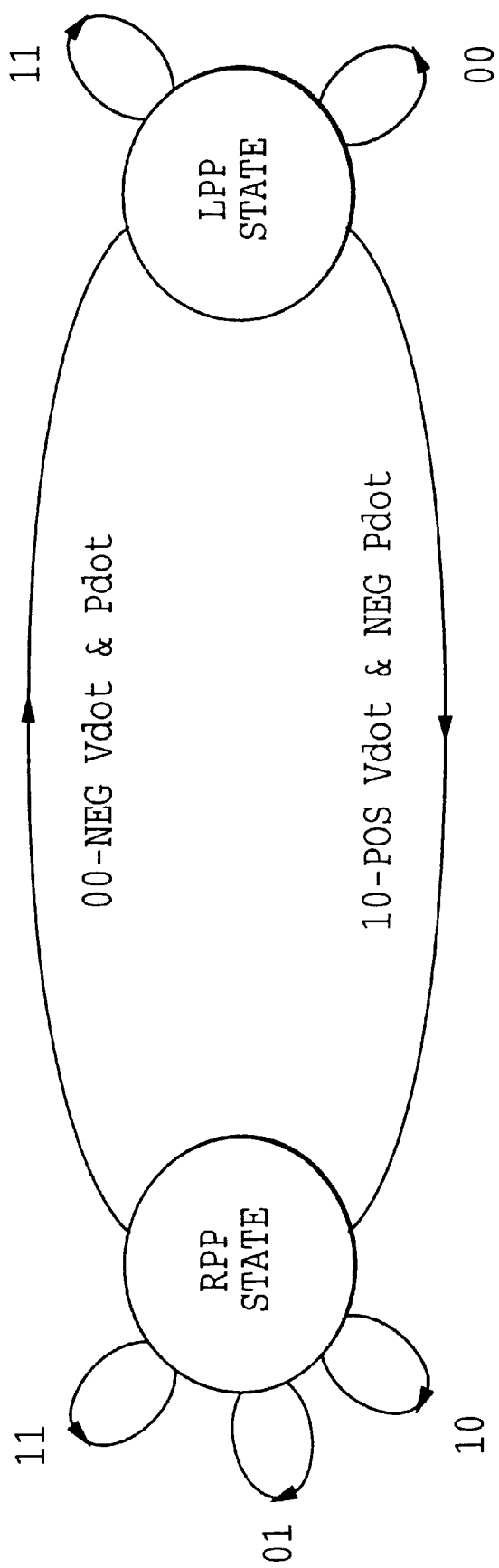
FIG. 4 is a state diagram showing the operation of the state machine illustrated in FIG. 3.

The operation of state machine 148 can be described according to a state diagram, as shown in FIG. 4. Upon power up, the state machine 148 is initialized to the second region of the power curve or right of peak power (RPP) state, also illustrated in the flow chart of FIG. 6. Being in the RPP state corresponds to a positive $V_{dot}$ and a negative $P_{dot}$ (a "10"state) or a negative $V_{dot}$, and a positive $P_{dot}$ (an "01" state). While in the RPP state, the solar array 112 is operating in the second region of the power curve. The only state that will cause the exclusive OR state machine 148 to switch to the second region of the peak power curve or left of peak power (LPP) state is when $V_{dot}$ and $P_{dot}$ are negative, represented by a "00" state. When in the LPP state, the solar array 112 is operating in the first region of the power curve. Accordingly, the state machine 148 determines whether the solar array 112 is operating in the RPP state or the LPP state. When in the RPP state, the state machine 148 does not switch when the logic states "01," "10" or "11" are detected. The state machine will switch to the LPP state only for the logic state "00." When in the LPP state, the state machine 148 does not switch when the logic states "11" or "00" are detected. The state machine 148 will switch to the RPP state only for logic state "10," corresponding to a positive $V_{dot}$ and a negative $P_{dot}$.

As shown in FIG. 3, the state machine 148, after evaluating $P_{dot}$ and $V_{dot}$, is capable of directing the analog switch 160 to be toggled such that the solar array 12 operates in either the peak power mode and the battery current control mode. The switch 160 will toggle between the peak power tracking mode and the battery current control mode depending upon whether the solar array 112 can completely supply satisfy the current demanded by the load 122, also shown in FIG. 3. First, when state machine 140 is in the RPP state, switch 160 may be positioned such that the solar array 112 operates in the battery current control mode. When the solar array 112 is operating in the battery current control mode, the output from the peak power tracking control 140 is determined by comparing the actual battery current, $I_b$, and the battery reference current, $I_{bref}$, to determine whether the solar array is able to satisfy the current demanded by the load 122. A summer 176 compares the actual battery current, $I_b$, to the battery reference current, $I_{bref}$. If the reference battery current, $I_{bref}$, is larger than the actual battery current, $I_b$, the solar array 112 is in a state where it cannot supply the current demanded by both the battery 118 and the load 122. In this state, the output from the summer 176 will saturate positively, and a programmed constant voltage 178 will be supplied to the positive terminal of a high gain amplifier 182 included in signal outputter 138. When the reference battery current, $I_{bref}$, is less than the actual battery current, $I_b$, the solar array 112 is able to supply the current demanded by both the battery 118 and the load 122. Under these conditions, the summer 176 will not saturate positively, and a voltage proportional to the demand of both the battery 118 and the load 122 will be supplied to the positive terminal of the high gain amplifier 182, as shown in FIG. 3.

Secondly, when the power demand by the load 122 and the battery 118 exceeds the instantaneous power available from the solar array 112, the system 130 will limit cycle around the peak power point. Specifically, the system will cycle or switch repeatedly between an RPP state and an LPP state (e.g., from an RPP state to an LPP state then back to an RPP state and back again to an LPP state, etc.). When the solar array 112 operates in the peak power tracking mode, the solar array 112 limit cycles at or near the peak power point because the solar array 112 is in a state where the power demanded by the battery 118 and the load 122 cannot be completely satisfied. In this condition, the state machine 148 commands the switch 160 to toggle between the RPP state (where control is from the summer 176) and the LPP state (where control is from the solar array negative voltage slew rate). In one embodiment, while in the peak power tracking mode, the system 130 cycles at or near the peak power point and enters the first and second region where the power level is about 98% to about 99.5% of the peak power level. In a preferred embodiment, the power level is allowed to enter the first and second regions by about 99% to about 99.7% of the peak power level.

Once the state of the solar array 112 has been determined, a signal from the current operating mode must be generated from the high gain amplifier 138, also shown in FIG. 3, to the power stage 114 so that the power stage 114 may direct the solar array 112 to discharge the appropriate amount of current. The high gain amplifier 182 has its negative terminal connected to the solar array voltage ramp rate control 184. The constant ramp voltage, as shown in FIG. 5B, controls the current into differentiator 186 to a constant ±K, as shown in FIG. 5A. A constant ±K level, in FIG. 5A, is required to maintain a constantly controlled solar array voltage ramp rate, in FIG. 5B, for the solar array sawtooth voltage. In the peak power tracking mode, a solar array sawtooth voltage is generated to the negative terminal of high gain amplifier 182. In FIG. 5B, the sawtooth voltage, having a predictable ramp voltage rate of change with time (±K) as shown in FIG. 5A, also generates a predictable solar array power rate of change with time, as shown in FIG. 5C. While the solar array 112 is operating in the peak power tracking mode, the predictable solar array power rate of change with time is related to the maximum power available from the solar array given the present conditions. This solar array sawtooth voltage feedback loop is especially useful in the peak power tracking mode because the peak power tracking control 140 is allowed to constantly limit cycle about the operating point rather than maintaining a static operating point. By limit cycling, the peak power tracking control 140 is not allowed to maintain an operating point that could cause the system to fail to the open circuit voltage or the short circuit current points. In this embodiment, the solar array 112 typically includes photovoltaic cells that convert solar energy to DC electrical power.

As shown in FIG. 3, the output voltage, $V_p$, generated from high gain amplifier 182 is directed to power stage 114. Accordingly, the power stage 114 is capable of directing the solar array 112 to discharge an appropriate current according to the operating mode. A first capacitor 119 and second capacitor 120 are coupled across bus lines 115 and 116 before and after power stage 114, respectively, and are used for smoothing the current across the bus. The power stage 114 is capable of directing the solar array 112 to discharge an output power stage current, $I_o$, that is proportional to $V_p$. The power stage output current, $I_o$, is supplied via bus line 115 to one of at least the battery 118 and load 122. When the solar array 112 is operating in the peak power tracking mode, the maximum current available from the solar array 112 is insufficient to meet the current demanded by the load 122 and the battery 118. In this mode, the power stage 114 is commanded to output a current, $I_o$, that corresponds to the maximum current available from the solar array 112 and the battery 118 is capable of discharging a current such that the current demand by load 122 is completely satisfied. When the solar array 112 is operating in the battery current control mode, the current available from the solar array 112 is sufficient to supply both the current demanded by battery 118 and the load 122. In this state, the power stage 114 is commanded to output a current, $I_o$, that corresponds to the current demanded by the battery 118 and the load 122. In this preferred embodiment, the battery 118 is more than one rechargeable battery (e.g. nickel cadmium or nickel hydrogen batteries) connected in parallel, and the load 122 is a motor or any other device used to perform needed tasks or functions in the satellite 110. Given the operating mode, when the solar array 12 is unable to completely satisfy the current demanded by the load 122, the battery 118 will discharge a current such that the current demanded by the load 122 will be completely satisfied. In the event that the solar array 112 is capable of completely satisfying the current demanded by the load 122, any excess current available may be used to charge the battery 118, should a charge be necessary.

Figure 7:
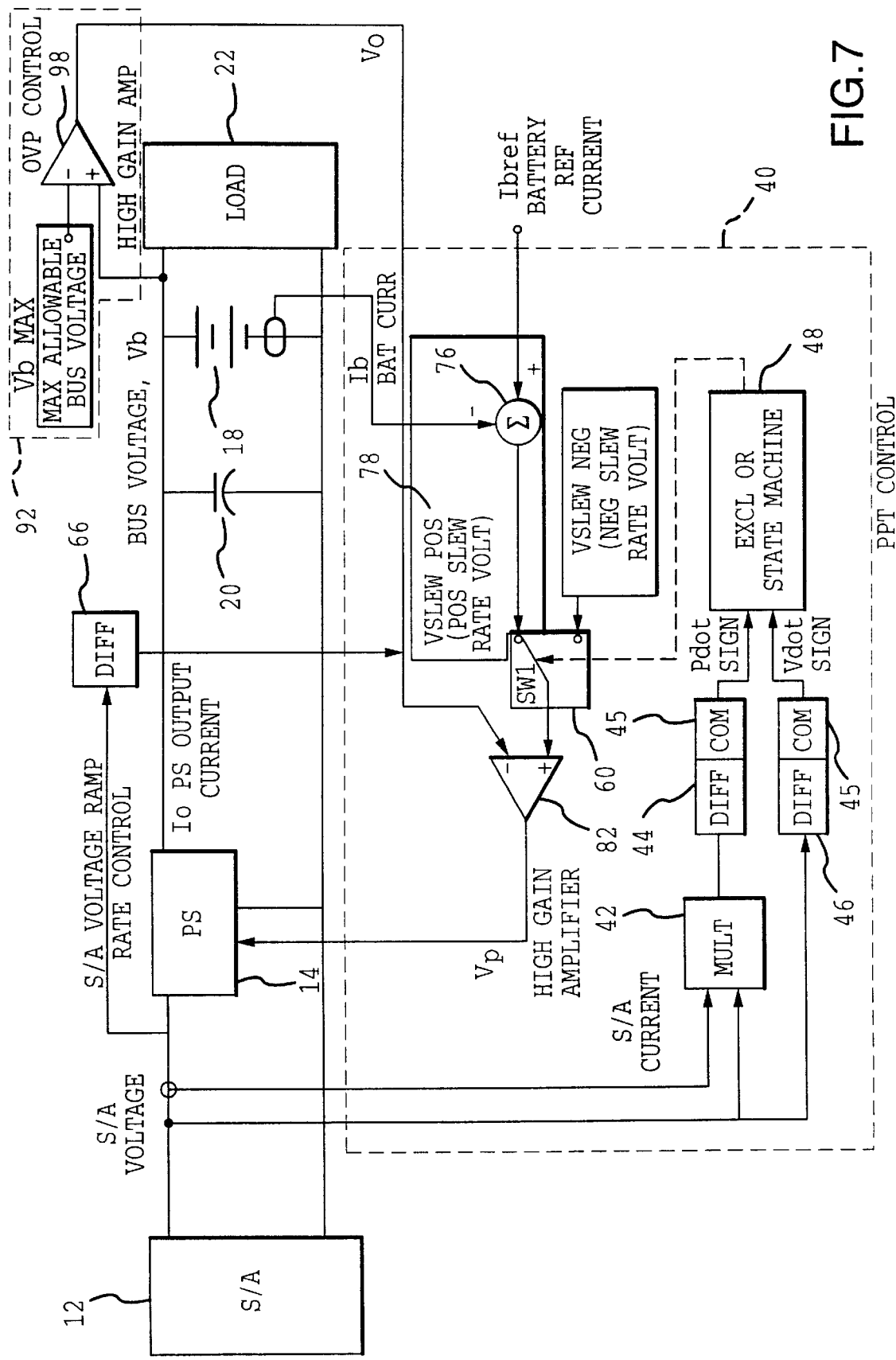
FIG. 7 is a block diagram illustrating yet another embodiment of the solar array source control system of the present invention.

In another embodiment, system 130 further includes overvoltage protection control 192, as shown in FIG. 7, for preventing detrimentally high bus voltages that could potentially damage the battery 118 or the load 122. The overvoltage protection 192 includes high gain amplifier 198. High gain amplifier 198 receives a fixed signal proportional to the maximum allowable bus voltage, $V_{bmax}$, at its negative terminal, and bus voltage, $V_b$, is supplied to the positive terminal. By implementation of the amplifier 198, the overvoltage protection control 192 is capable of keeping the bus voltage, $V_b$, below the predetermined maximum allowable bus voltage, $V_{bmax}$, by comparing the two values. When the bus voltage, $V_b$, is greater than the maximum allowable bus voltage, $V_{bmax}$, the high gain amplifier 198 produces a proportional voltage, $V_o$, that will be supplied to the negative terminal of amplifier 182 in the peak power tracking control 140. In either the battery current control mode or the peak power mode, the voltage generated by the solar array 112 that is directed to the positive terminal of the high gain amplifier 182 will be decreased by voltage, $V_o$, which is directed to the negative terminal of the high gain amplifier 182. In this regard, the decrease in voltage created by the high gain amplifier 182 will ensure that the resultant bus voltage will be less than the fixed maximum allowable bus voltage, $V_{bmax}$. Conversely, when the bus voltage, $V_b$, is less than the fixed maximum allowable voltage 194, high gain amplifier does not create the previously described voltage, $V_o$, and a decrease in the bus voltage will not be caused. Therefore, the voltage generated to the high gain amplifier 182 in either the peak power tracking mode or the battery current control mode will be directed to the power stage 114 and an appropriate current will be produced from the solar array 112.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A satellite comprising:
   means for converting solar energy into electric energy, wherein voltage and current signals output by said means for converting can be characterized by a power-voltage curve having a peak power point with zero slope, a first region to the left of said peak power point with a positive slope, and a second region to the right of said peak power point with a negative slope;

battery means for storing electric energy provided by said means for converting;

load means for receiving electric energy from at least one of said means for converting and said battery means, said battery means being capable of providing electric power to said load means, and for using said electric power to perform satellite tasks; and means for controlling application of electric energy produced by said means for converting to at least one of said battery means, for charging said battery means, and said load means, for performing said satellite task, wherein said means for controlling includes means for peak power tracking of an electric power signal supplied by said means for converting about said peak power point in only one of a battery current control mode, wherein said power output from said means for converting is in said second region, and a peak power tracker mode, wherein said power output from said means for converting is in said first region, wherein said means for peak power tracking includes means for receiving and measuring the voltage and current signals from the means for converting solar energy which additionally generates sign of the times derivatives for power and voltage output from the means for converting solar energy in order to determine an instantaneous operating power region on said power-voltage curve.

2. A satellite, as claimed in claim 1, wherein said means for peak power tracking cycles electric power suppliable from said means for converting about said peak power point, between said first and second regions.

3. A satellite, as claimed in claim 1, wherein said means for peak power tracking comprises means for calculating time derivatives of electric power and voltage from said means for converting to determine an instantaneous operating power region on said curve for said means for converting, wherein said time derivatives are indicative of operation in one of said first and second regions of said curve.

4. A satellite, as claimed in claim 1, wherein said means for peak power tracking comprises first and second differentiators for calculating time derivatives of electric power and voltage suppliable from said means for converting, and first and second comparators for comparing said time derivatives of electric power and voltage to predetermined threshold value and for calculating signs of said time derivatives of electric power and voltage, respectively, to obtain an instantaneous operating power region on said curve for said means for converting, wherein said time derivatives of both electric power and voltage determine operation in one of first and second states.

5. A satellite, as claimed in claim 4, wherein said means for converting operates in said first state when signs of said time derivatives of said electric power and voltage are similar.

6. A satellite, as claimed in claim 4, wherein said means for converting operates in said second state when signs of said time derivatives of said electric power are dissimilar.

7. A satellite, as claimed in claim 1, wherein said means for peak power tracking comprises:

first and second differentiators for calculating time derivatives of electric power and voltage suppliable from said means for converting;

first and second comparators for comparing said time derivatives of electric power and voltage to predetermined threshold values and for calculating signs of said time derivatives of electric power and voltage to obtain instantaneous operating regions on said curve for said means for converting, wherein signs of said time derivatives of electric power and voltage correspond to one of first and second states;

said first state and said second region corresponding to the signs of said time derivatives of electric power and voltage being dissimilar, said second state and said first region corresponding to the signs of said time derivatives of electric power being similar;

a first circuit operable when a first instantaneous operating region on said curve for said means for converting is in said second region, said first circuit including an analog system for determining voltage supplied by said means for converting to at least one of said load means and said battery means;

a second circuit operable when said first instantaneous operating region on said curve for said means for converting is at or near said peak power point, said second circuit supplying a first predetermined voltage from said means for converting to said load means; and a means for operating connected to said first and second circuits for selectively activating said first and second circuits.

8. A satellite, as claimed in claim 7, wherein said means for operating comprises:

an analog switch; and a state machine connected to said analog switch activating said first circuit when the signs of said time derivatives of said electric power and voltage are dissimilar, and activating said second circuit when the signs of said time derivatives of electric power and voltage are similar.

9. A satellite, as in claim 8, wherein said state machine is an exclusive OR state machine.

10. A satellite, as claimed in claim 7, wherein said first predetermined voltage corresponds to a negative predetermined ramp voltage rate of change with time, wherein said battery means supplies to said load means a voltage corresponding to a difference between said predetermined voltage and a load means demand voltage, said load means demand voltage corresponding to a voltage required by said load means for performing satellite tasks.

11. A satellite, as claimed in claim 7, wherein said analog system comprises:

a means for comparing an actual battery current from said battery means with a reference battery current, said reference battery current being a function of a temperature of said battery means;

a second predetermined voltage suppliable by said analog system when said actual battery current is greater than said reference battery current; and a voltage demanded by said load means and said battery means being supplied by said analog system when said reference battery current is greater than said actual battery current.

12. A satellite, as claimed in claim 11, wherein said means for comparing is a summer.

13. A satellite, as claimed in claim 11, wherein said second predetermined voltage corresponds to a positive predetermined ramp voltage rate of change with time, wherein said battery means supplies to said load means a voltage corresponding to a difference between said predetermined voltage and a load means demand voltage, said load means demand voltage corresponding to a voltage required by said load means for performing satellite tasks.

14. A satellite, as claimed in claim 11, wherein said battery control mode corresponds to a first condition in which said reference battery current is greater than said actual battery current, and said peak power control mode corresponds to a second condition in which said actual battery current is greater than said reference battery current.

15. A satellite, as claimed in claim 1, wherein said means for converting solar energy into electric power comprises at least one photovoltaic generator.

16. A satellite, as claimed in claim 1, wherein said battery means comprises at least one battery.

17. A satellite, as claimed in claim 1, wherein said battery means comprises a plurality of batteries connected in parallel.

18. A system for controlling electrical energy provided by a solar array to at least one of a battery and a load member, wherein power output by the solar array is characterized by a power voltage curve having a peak power point with zero slope, a first region to the left of the peak power point having a positive slope, and a second region to the right of the peak power point having a negative slope, said system comprising:

means for receiving instantaneous inputs indicative of amounts of voltage and current being output by the solar array, current available from the battery and current needed for charging the battery;

means for outputting a control signal indicative of current to be supplied from the solar array to at least one of the battery and the load member; and means for processing said inputs to produce said control signal, wherein said means for processing includes means for peak power tracking of electric power provided by the solar array in only one of a battery current control mode, wherein the power output from the solar array is in the second region, and a peak power tracker mode, wherein the power output from the solar array is in the first region, wherein said means for peak power tracking comprises means for receiving and measuring the voltage and current output by the solar array and additionally generating a sign of the times derivatives of electric power and voltage output by the solar array wherein the sign of the times derivatives are used to determine an instantaneous operating power region on said power voltage curve.

19. A system, as claimed in claim 18, wherein said means for peak power tracking cycles electric power suppliable from said solar array about said peak power point, between said first and second regions.

20. A system, as claimed in claim 18, wherein said means for peak power tracking comprises:

a means for multiplying said current and said voltage being output by the solar array to obtain electric power being output from the solar array;

first and second differentiators for calculating time derivatives of electric power and voltage suppliable from the solar array;

first and second comparators for comparing said time derivatives of electric power and voltage to predetermined threshold values and for calculating signs of said time derivatives of electric power and voltage to obtain instantaneous operating regions on said curve for said solar array, wherein the signs of said time derivatives of electric power and voltage correspond to one of first and second states.

21. A system, as claimed in claim 20, wherein said solar array operates in said first state when the signs of said time derivatives of said electric power and voltage are dissimilar.

22. A system, as claimed in claim 20, wherein said solar array operates in said second state when the signs of said time derivatives of said electric power and voltage are similar.

23. A system, as claimed in claim 18, wherein said means for peak power tracking comprises:

a means for multiplying said current and said voltage being output by the solar array to obtain electric power being output from the solar array;

first and second differentiators for calculating time derivatives of electric power and voltage suppliable from said means for converting;

first and second comparators for comparing said time derivatives of electric power and voltage to predetermined threshold values and for calculating signs of said time derivatives of electric power and voltage to obtain instantaneous operating regions on said curve for said means for converting, wherein the signs of said time derivatives of electric power and voltage correspond to one of first and second states;

said first state and said second region corresponding to the signs of said time derivatives of electric power and voltage being dissimilar, said second state and said first region corresponding to the signs of said time derivatives of electric power being similar;

a first circuit operable when a first instantaneous operating region on said curve for said means for converting is in said second region, said first circuit including an analog system for determining voltage supplied by said means for converting to at least one of said load means and said battery means;

a second circuit operable when said first instantaneous operating region on said curve for said means for converting is at or near said power point, said second circuit supplying a first predetermined voltage from said means for converting to said load means; and a means for operating connected to said first and second circuits for selectively activating said first and second circuits producing a second operating point on said curve for said means for converting at or near said peak power point.

24. A system, as claimed in claim 23, wherein said means for operating comprises:

an analog switch; and a state machine connected to said analog switch activating said first circuit when the signs of said time derivatives of said electric power and voltage are dissimilar, and activating said second circuit when the signs of said time derivatives of said electric power and voltage are similar.

25. A system, as claimed in claim 23, wherein said state machine is an exclusive OR state machine.

26. A system, as claimed in claim 23, wherein said first predetermined voltage corresponds to a negative predetermined ramp voltage rate of change with time, wherein said battery means supplies to said load means a voltage corresponding to a difference between said predetermined voltage and a load means demand voltage.

27. A system, as claimed in claim 23, wherein said battery current control mode corresponds to a first condition in which said reference battery current is greater than said current available from the battery, and said peak power control mode corresponds to a second condition in which said actual battery current is greater than said reference battery current.

28. A system, as claimed in claim 23, wherein said analog system comprises:

a means for comparing said current available from the battery with a reference battery current, said reference battery current being a function of a temperature of said battery means;

a second predetermined voltage suppliable by said analog system when said current available from the battery is greater than said reference battery current; and a voltage demanded by said battery and said load member being supplied by said analog system when said reference current is greater than said current available from the battery.

29. A system, as claimed in claim 28, wherein said means for comparing is a summer.

30. A system, as claimed in claim 28, wherein said second predetermined voltage corresponds to a positive predetermined ramp voltage rate of change with time, wherein said battery supplies to said load member, a voltage corresponding to the difference between said predetermined voltage and a load member demand voltage, said load member demand voltage corresponding to a voltage required by said load member.

31. A system, as claimed in claim 28, wherein said second predetermined voltage corresponds to a positive predetermined ramp voltage rate of change with time, wherein said battery supplies to said load member a voltage corresponding to the difference between said predetermined voltage and a load member demand voltage, said load member demand voltage corresponding to a voltage required by said load member.

32. A system, as claimed in claim 18, wherein said solar array comprises at least one photovoltaic generator.

33. A system, as claimed in claim 18, wherein said battery means comprises at least one battery.

34. A system, as claimed in claim 18, wherein said battery comprises a plurality of batteries connected in parallel.

35. A system, as claimed in claim 18, further comprising an overvoltage protection control, wherein said overvoltage control comprises:

means for comparing a bus voltage with a maximum reference bus voltage, wherein said bus voltage corresponds to the actual voltage on a connection between said solar array and said battery and said load member and said maximum reference bus voltage corresponds to the maximum voltage allowable on said connection between said solar array and said battery and said load member; and means for decreasing said control signal from said means for outputting, wherein said control signal is decreased when said bus voltage is greater than said maximum reference bus voltage and said control signal producing a current from said solar array such that said bus voltage corresponding to said current is below said maximum reference voltage.

36. A system, as claimed in claim 18, further comprising an overvoltage protection control, wherein said overvoltage control comprises:

means for comparing a bus voltage with a maximum reference bus voltage, wherein said bus voltage corresponds to the actual voltage on a connection between said means for converting energy and said battery means and said load means and said maximum reference bus voltage corresponds to the maximum voltage allowable on said connection between said energy converting means and said battery means and said load means; and means for decreasing a control signal output for the means for controlling application of electric energy, wherein said control signal is decreased when said bus voltage is greater than said maximum reference bus voltage and said control signal producing a current from said solar array such that said bus voltage corresponding to said current is below said maximum reference voltage.

* * * * *